(12) United States Patent
Rohe et al.

(10) Patent No.: US 8,715,827 B2
(45) Date of Patent: May 6, 2014

(54) POROUS SPHERICAL TITANIUM DIOXIDE

(75) Inventors: Bernd Rohe, Moers (DE); Markus Schulte, Oberhausen (DE); Christian Spitzwieser, Rheinberg (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 13/822,313

(22) PCT Filed: Sep. 19, 2011

(86) PCT No.: PCT/DE2011/075226
§ 371 (c)(1),
(2), (4) Date: Apr. 12, 2013

(87) PCT Pub. No.: WO2012/062303
PCT Pub. Date: May 18, 2012

(65) Prior Publication Data
US 2013/0189520 A1    Jul. 25, 2013

(30) Foreign Application Priority Data
Sep. 22, 2010 (DE) .................. 10 2010 041 189

(51) Int. Cl.
*B32B 5/16* (2006.01)

(52) U.S. Cl.
USPC .......... 428/402; 428/304.4; 423/69; 423/598; 423/610

(58) Field of Classification Search
USPC .................. 428/402, 304.4; 423/69, 598, 610
See application file for complete search history.

(56) References Cited

U.S. PATENT DOCUMENTS

| | | | |
|---|---|---|---|
| 6,613,234 B2 * | 9/2003 | Voute et al. | 210/656 |
| 7,678,360 B2 * | 3/2010 | Okada et al. | 423/544 |
| 2002/0005383 A1 * | 1/2002 | Voute et al. | 210/656 |
| 2006/0263291 A1 | 11/2006 | Torardi | |
| 2010/0133182 A1 | 6/2010 | Sun et al. | |

FOREIGN PATENT DOCUMENTS

| | | | |
|---|---|---|---|
| GB | 1 176 046 A | | 1/1970 |
| GB | 1176046 | * | 1/1970 |
| WO | 2008/076082 A1 | | 6/2008 |
| WO | WO2008/076082 | * | 6/2008 |

OTHER PUBLICATIONS

International application No. PCT/DE2011/075226, English Translation of International Preliminary Report on Patentability, dated Mar. 2013.

* cited by examiner

*Primary Examiner* — Leszek Kiliman
(74) *Attorney, Agent, or Firm* — Cahn & Samuels, LLP

(57) ABSTRACT

A particulate porous spherical titanium dioxide has a $TiO_2$ content of at least 99.0% by weight, a particle size $d_{50}$ in the range of 30 to 350 μm, a tight particle size distribution (B 90/10) in the region of a maximum of 120 μm, a pore diameter of 1 to 30 nm, a pore volume of at least 0.1 cm³/g, and a surface area of 30 to 300 m²/g (BET).

14 Claims, 2 Drawing Sheets

Particle size/μm

POROUS SPHERICAL TITANIUM DIOXIDE

This U.S. patent application is a national stage application of PCT/DE2011/075226 filed on 19 Sep. 2011 and claims priority of German patent document 10 2010 041 189.2 filed on 22 Sep. 2010, the entireties of which is incorporated herein by reference

FIELD OF INVENTION

The invention concerns a novel titanium oxide material, a process for the production thereof and use thereof as a carrier material in multi-phase systems.

BACKGROUND OF INVENTION

Basically a particulate material is subject to physical and chemical influences which influence the resistance and the long-term suitability of the material. Thus in particular porous metal oxide particles, when acted upon by a pressure, have a tendency to instability of the particles and in particular when acted upon with aqueous solvent systems, particularly in the case of acid or basic systems, they have a tendency to rehydration of the metal oxide surface. The instability of the particles and the particle breakages resulting therefrom and also rehydration of the surface result in the particles forming lumps. Consequently the flow in a bulk mass of the particles is made more difficult and thus in the course of time blockages are caused in the bulk mass of particles, which make the bulk mass unusable.

In addition in processes in which separation of the particles is required, such separation of the fine particles which have been produced as a consequence of particle breakage is only possible using complicated and expensive technology, and the suspension effect makes re-use of the material almost impossible.

In principle there are demands in particular in regard to particle stability of the materials for a large number of applications and processes on a large technical scale such as for example Fischer-Tropsch processes, for example trans-esterification reactions, and also in chromatography.

In those processes the pore size and the distribution thereof on the one hand are also of significance in regard to stability and also reactivity and suitability in terms of process technology.

A large number of metal oxide materials for chemical and catalytic applications are known in the state of the art. Thus U.S. Pat. No. 4,422,960 discloses a particulate material for the hydrotreatment of a heavy hydrocarbon oil, wherein the material has a content of metal oxide comprising aluminium oxide, silicon dioxide, titanium dioxide, boron oxide, zirconium oxide, silicon dioxide-aluminium oxide, silicon dioxide-magnesium oxide, aluminium oxide-magnesium oxide, aluminium oxide-titanium dioxide, silicon dioxide-titanium dioxide and aluminium oxide-boron oxide.

Since the application for that U.S. Pat. No. 4,422,960 there has been a whole series of investigations and inventions which aimed at improving the particle properties on the basis of metal oxides. It will be noted however that satisfactory results have been achieved only to a reasonable extent. There is therefore a need for particulate material which in particular has improved particle stability with at the same time optimised pore size and distribution thereof.

The inventors have now succeeded in developing a particulate material based on metal oxide, which is surprisingly chemically and physically stable under supercritical hydrothermal conditions and in aqueous and protic media.

SUMMARY OF INVENTION

Thus according to the invention there is provided a material which satisfies those demands. More precisely the invention concerns a porous spherical titanium dioxide with a $TiO_2$ content of at least 99.0% by weight and with
  a particle size $d_{50}$ in the range of 30 to 350 μm,
  a tight particle size distribution (B90/10) in the region of a maximum of 120 μm,
  a pore diameter of 1 to 30 nm,
  a pore volume of at least 0.1 $cm^3/g$,
  a surface area of 30 to 300 $m^2/g$ (BET).

DETAILED DESCRIPTION OF INVENTION

Figure 1:
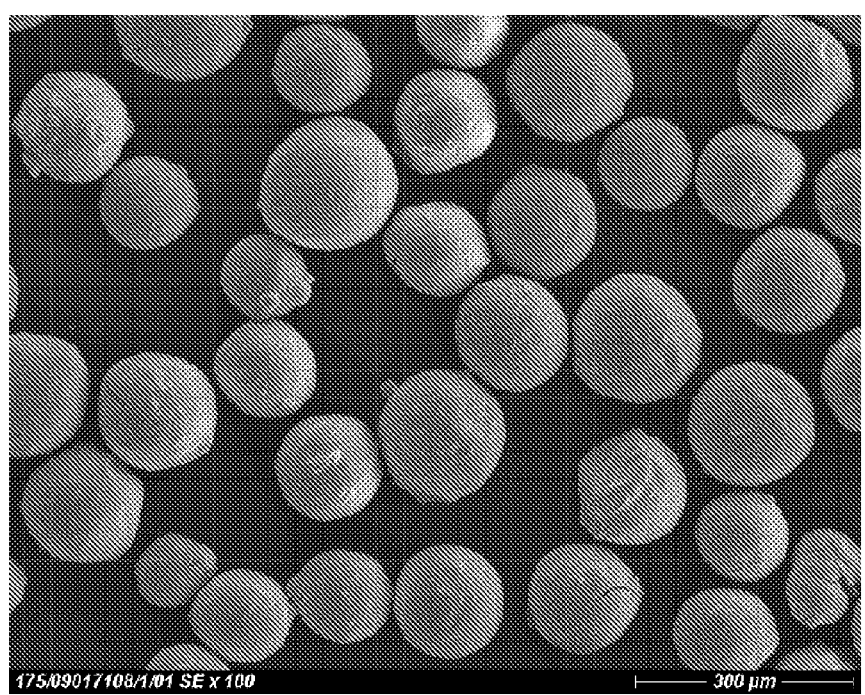
FIG. 1 shows an REM image of a material with uniform spherical structure and its low content of fine and coarse grain.

The particulate material according to the invention is mechanically and chemically stable in aqueous solutions over the entire pH-range of 0 to 14. As the material according to the invention does not contain any additives which can detrimentally influence stability the material according to the invention is characterised by a content of $TiO_2$ of more than 99% by weight.

The material according to the invention is distinguished in particular in that chemical stability and physical stability can be achieved without the use of binding agents and without organic compounds in manufacture and the material according to the invention is thus free of such compounds or residues thereof. The inventors' investigations in regard to hydrothermal stability have shown that the material according to the invention is stable even under stringent HT-conditions of more than 40 bars at a temperature of more than 250° C. and does not exhibit any fine grain formation.

A material with a particle size $d_{50}$ in the range of 40 to 250 μm, in particular in the range of 60 to 150 μm, quite particularly in the range of 80 to 120 μm is advantageous. In that respect the particle size of the material according to the invention can be in particular in a range of 0.25 to 1.5 times the $d_{50}$ value around that $d_{50}$ value as long as the aforementioned limits are observed. In that respect the inventors recognised that a tight particle size distribution (B 90/10) in the region of a maximum of 120 μm is advantageous.

The material according to the invention has a pore diameter in the range of 1 to 30 nm, wherein a pore size in the range of 1-20 nm, particularly 4-20 nm on the one hand has a promotional effect on the structure and stability of a bulk mass of the material according to the invention, while on the other hand it affords an adequate pore volume for the desired use.

In general the pore volume is at least 0.1 $cm^3/g$ of material according to the invention, in particular at least 0.12 $cm^3/g$. In general the production process according to the invention gives an upper limit for the pore volume of 0.4 $cm^3/g$ of material according to the invention.

In that respect a specific surface area in the region of at least 30, particularly at least 60 $m^2/g$ is afforded, and as an upper limit up to 300 $m^2/g$, in particular in the region of 70 to 150 $m^2/g$ (BET). If the spray grain obtained in the production process according to the invention is to be further calcined the specific surface area can fall after the calcination operation to a lower value compared to the spray grain. That reduction in specific surface area can then be in the range of 20 to 50% of the initial value.

The particulate material according to the invention can be produced by means of the process according to the invention. For that purpose an aqueous suspension with a content of 1-50% by weight of finely divided, highly surface area-rich titanium dioxide is used and sprayed into a spray tower which can be operated in various modifications, in particular a fountain configuration, and thus the solvent evaporates.

In that case, conveyor speed of the suspension, nozzle shape, temperature and air speed in the spray drier are so selected that individually separated/individual droplets of the suspension, that is to say without contact with 'adjacent droplets', are introduced in a size of 700 to 1200 μm into the spray tower and dried.

Instead of the titanium dioxide used it is also possible to employ hydrated precursor forms of other metal oxides such as $Al_2O_3$, $SiO_2$ or ZnO or mixtures thereof, and to so adjust the parameters of the conveyor speed of the suspension, nozzle shape, temperature and air speed in the spray drier that individually separated/individual droplets of the suspension, that is to say without contact with 'adjacent droplets', of a size of 700 to 1200 μm, are introduced into the spray tower and dried to give spray grain and then sieved and/or calcined according to the respective demand on the material.

The aqueous suspension of titanium dioxide, which is preferably used here as the starting material, can be obtained in particular from neutrally washed commercially available metatitanic acid which, if desired, is re-dispersed using wet grinding apparatuses such as bead mills with $ZrO_2$ beads of a diameter of <0.5 mm, in particular 0.1 mm. Generally dry grinding is not required.

The content of finely divided, highly surface area-rich titanium dioxide in the suspension used is selected in dependence on the desired particle size and is advantageously 5 to 25% by weight. In that case according to the invention the highly surface area-rich titanium dioxide has a surface area of at least 250 $m^2/g$, advantageously at least 280 $m^2/g$ and at most 400 $m^2/g$, in particular 350 $m^2/g$.

It is of particular advantage if the finely divided, highly surface area-rich titanium dioxide used has a high number of free hydroxyl groups, generally more than 6 OH groups/$nm^2$, advantageously more than 10 OH groups/$nm^2$, at the surface of the suspension particles. The number of OH groups can be determined by way of the process in accordance with Zerewittinoff. For that purpose a defined amount of dry $TiO_2$ is provided under a protective gas in a vessel in an inert organic solvent and the amount of hydrogen formed is determined after the addition of methyl lithium. With knowledge of the specific surface area of the $TiO_2$ used it is then possible to calculate the number of OH groups per $nm^2$.

The aqueous suspension is sprayed in a fountain configuration out of at least one pressure nozzle directed upwardly in the drying tower and in counter-flow relationship thereto, a drying inert gaseous medium is introduced into the drying tower, that gaseous medium having been heated by way of a burner. The entry temperature of the gaseous medium, preferably air, is in that case generally 400 to 600° C., preferably 450 to 550° C.

The dried particles are caught in the drying tower by way of a collecting device and entrained particles are caught in at least one separator. The separators can be for example cyclones, wet, dry or electric filters.

When the aqueous suspension is introduced into the spray drier the conveyor speed of the suspension, nozzle shape, temperature and air speed in the spray drier are so selected that individually separated/individual droplets of the suspension, that is to say without contact with 'adjacent droplets', generally of a size of 700 to 1200 μm, are introduced into the spray tower and dried. Depending on the respective concentration of the aqueous suspension used the desired particle size can be adjusted in dependence on the aforementioned parameters. In that respect the parameters consisting of the conveyor speed of the suspension, nozzle shape, temperature and air speed can be determined by the man skilled in the art in dependence on the spray drying apparatus used, and adjusted to the suspension employed. By way of example a spray drying installation can be operated with a feed pump pressure of 4-12 bars, in particular 8 bars, with a nozzle diameter of 1-4 mm, in particular 2-3 mm, a concentration of the solution/suspension of 1-50% by weight, in particular 5-20% by weight and quite particularly 8-15% by weight, and a throughput of suspension of 0.3-0.8 $m^3/h$, in particular 0.4-0.6 $m^3/h$. It is also advantageous to use a spray nozzle with a spray cone angle of 12° to 75°, in particular 45° to 60°, in the spray tower. The hot gas feed into the spray tower can be from all sides, in which respect the hot gas feed from above is advantageous.

The operation of determining the droplet size can be effected by means of a Drying Kinetics Analyzer from Gea-Niro or by means of a phase Doppler anemometer (PDA) as optical measuring systems which contactlessly and simultaneously measure the speed and the diameter of spherical particles/drops. The measurement processes and parameters are known to the man skilled in the art.

If drying in the spray tower does not already afford a material with a proportion of fine grain (<30 μm) and coarse grain (>350 μm) of less than 5% by weight, then the drying operation can be followed by separation of very fine particles (<30 μm) and coarse particles (>350 μm), which desirably takes place by way of sieving/sifting or sedimentation.

If desired, $TiO_2$ spray grain obtained can be calcined at a temperature in the range of 400° C. to 600° C. over a period of 30 to 300 minutes to consolidate the pore structure. Substantially no agglomerates of $TiO_2$ particles are formed during the calcination operation. Only a small proportion of generally less than 5% by weight of coarse grain with a grain size of more than 350 μm can be formed, which, as described hereinbefore, can be separated off.

The small proportion of fine grain (<30 μm) and coarse grain (>350 μm) of less than 5% by weight in the case of spray grain and also the calcined material demonstrate the superiority of the combination developed according to the invention of the production process with the starting material.

The titanium dioxide grain obtained is suitable for being used as a carrier for active substances in multi-phase systems, for example in chromatography or catalysis. In that respect the roundness and uniformity of the particles have a positive effect on the powder bulk mass and the through-flow in those multi-phase systems and also in relation to suspension systems and fixed bed arrangements.

The measurement processes used in accordance with the invention for determining the parameters are as follows. The particle size and particle size distribution are effected by means of laser diffraction similarly to ISO standard 13320. For sample preparation a 1% aqueous suspension is produced by means of a glass stirrer. The particle size can also be determined by evaluation of light microscopy and REM images. Here the particles photographed on the photographs are individually measured and the data are statistically processed. The particle surface area is determined in accordance with the BET multi-point method similarly to ISO 9277. The pore diameters and pore volumes are determined by means of gas adsorption similarly to DIN 66135.

The invention is further described by means of the following Example.

Production Example

A washed metatitanic acid filter cake neutralised to pH 7 with 50% soda lye is dispersed by means of a bead mill using zirconium oxide beads of a size of 0.5 mm. The resulting dispersion is set to a solids proportion of 20% by weight of titanium dioxide by the addition of water and then dried by way of a spray tower under the following conditions:
  gas entry temperature 500° C.
  air-heated natural gas firing system
  coarse material discharge
  cyclone discharge
  spray atomisation of the suspension in a fountain configuration.

The spray grain obtained is distinguished by the following physical data:

| | |
|---|---|
| d50: | 112 μm |
| B 90/10: | 104 μm |
| specific surface area (BET): | 97.7 m$^2$/g. |

It is found that the individual particles are of a spherical shape, there is almost no fine component and the proportion of structure-damaged particles is very small (FIG. 1).

The spray grain is then calcined at 450° C. for 3.5 hours in a batch furnace and thereafter the calcined spray grain is freed of particles of less than 30 μm and larger than 200 μm by way of fractionated sifting.

The calcined material produced in that way has the following physical data:

| | |
|---|---|
| d50: | 106 μm |
| B 90/10: | 111 μm |
| pore volume: | 0.21 cm$^3$/g |
| pore diameter: | 5.8 nm |

Figure 2:
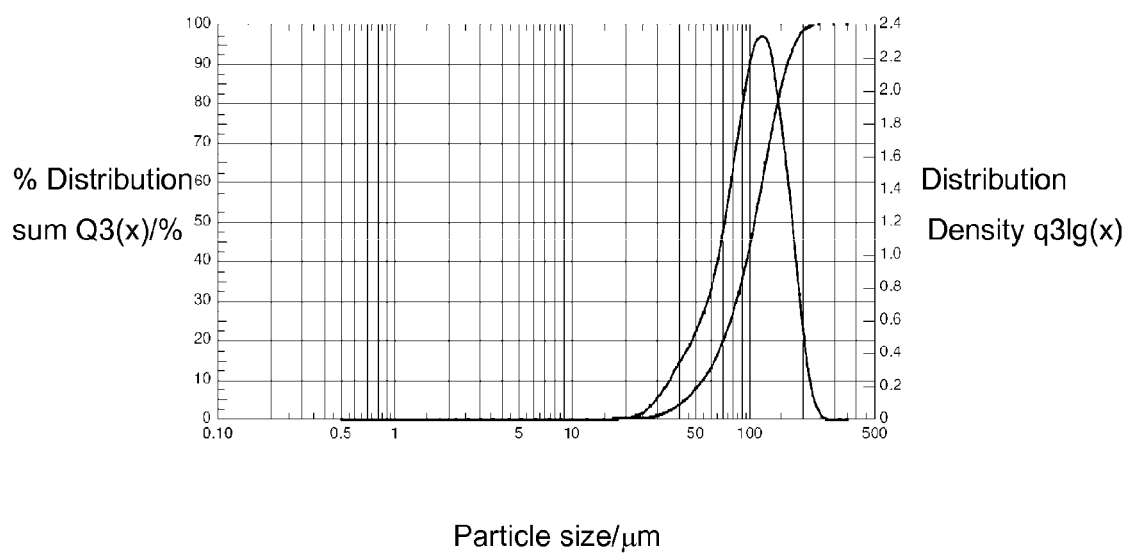
FIG. 2 shows grain size distribution.

FIG. 1 shows an REM image of the material obtained in that way and the uniform spherical structure of the material and also its low content of fine and coarse grain. The grain size distribution is shown in FIG. 2.

Stability Investigation of the Material Produced in Example 1

To investigate the physical and chemical stability of the material produced in Example 1 the material was subjected to two stability tests under hydrothermal conditions.

For that purpose 140 g of a material obtained after calcination as in the above-indicated Example, of a particle size ($d_{50}$) of 110 μm with a pore size of 60 Å ($d_p$/Å) was suspended in 1200 ml of TE water by shaking (duration 30 sec.) in a closed vessel.

The resulting suspension was immediately transferred into a glass receiving container of a 2 l autoclave and subjected without agitation to an HT treatment under conditions at 10 bars and 180° C. over 6 hours (HT 1). After removal of a partial amount of the material obtained in that way, that partial amount was subjected to a strength investigation.

Another part of the material was re-suspended by being shaken afresh (30 sec.), transferred back into the glass receiving container of the autoclave and subjected without agitation to a further HT treatment under conditions at 40 bars and 255° C. over 8 hours (HT 2).

The suspension respectively obtained after the HT treatments (HT 1 and HT 2) was visually assessed after sedimentation on the basis of the aqueous supernatant. As usually very minimal fine components already afford a milkily cloudy supernatant these investigations demonstrate that the material according to the invention is chemically and physically stable under supercritical, hydrothermal conditions in aqueous and protic media. Because of those properties the material according to the invention is excellently well suited as a carrier material in multi-phase systems as it has no tendency to particle breakages or rehydration of the surface. That therefore prevents lump formation of the particles and the flow in a bulk mass of the particles remains uninfluenced.

Therefore it is possible by means of the process according to the invention to obtain a $TiO_2$ spray grain according to the invention, in which the drop sizes and thus also the spray grain size can be specifically targetedly adjusted and the $TiO_2$ spray grain according to the invention can also be produced binder-free and without the addition of organic additives. Such a process and material are astounding and are not known in the state of the art.

The invention claimed is:

1. A particulate porous spherical titanium dioxide, comprising:
   a $TiO_2$ content of at least 99.0% by weight and having
     a particle size $d_{50}$ in the range of 30 to 350 μm,
     a tight particle size distribution (B 90/10) in the region of a maximum of 120 μm,
     a pore diameter of 1 to 30 nm,
     a pore volume of at least 0.1 cm$^3$/g, and
     a surface area of 30 to 300 m$^2$/g (BET).

2. A particulate porous spherical titanium dioxide according to claim 1 with a particle size $d_{50}$ in the range of 40 to 250 μm.

3. A particulate porous spherical titanium dioxide according to claim 1 with a pore size in the range of 1 to 30 nm.

4. A process for the production of a particulate porous spherical titanium dioxide according to claim 1 which includes the step of introducing an aqueous suspension with a content of 1-50% by weight of finely divided, highly surface area-rich titanium dioxide into a spray tower, wherein the conveyor speed of the suspension, the nozzle shape, the temperature and the air speed in the spray drier are so selected that individually separated/individual droplets of the suspension, that is to say without contact with adjacent droplets, of a size of 700 to 1200 μm, are introduced into the spray tower and dried.

5. A process for the production of a particulate porous spherical titanium dioxide according to claim 4 in which the spray drier is operated in a fountain configuration.

6. A process for the production of a particulate porous spherical titanium dioxide according to claim 4 in which the finely divided, highly surface area-rich titanium dioxide used has a number of free hydroxyl groups about more than 10 OH groups/nm$^2$ at the surface of the suspension particles.

7. A particulate porous spherical titanium dioxide according to claim 1 with a particle size $d_{50}$ in the range of 60 to 150 μm.

8. A particulate porous spherical titanium dioxide according to claim 1 with a particle size $d_{50}$ in the range of 80 to 120 μm.

9. A particulate porous spherical titanium dioxide according to claim 1 with a pore size in the range of 1 to 20 nm.

10. A particulate porous spherical titanium dioxide according to claim 1 with a pore size in the range of 4 to 20 nm.

11. A process for the production of a particulate porous spherical titanium dioxide according to claim 4 in which the finely divided, highly surface area-rich titanium dioxide used has a number of free hydroxyl groups more than 20 OH groups/nm$^2$ at the surface of the suspension particles.

12. A multi-phase system comprising a particulate porous spherical titanium dioxide according to claim 1.

13. A multi-phase system according to claim 12, wherein a carrier for active substances comprises the particulate porous spherical titanium dioxide.

14. A process for the production of a particulate porous spherical titanium dioxide, comprising:
   introducing an aqueous suspension with a content of 1-50% by weight of finely divided, highly surface area titanium dioxide into a spray tower;
   selecting a conveyor speed of the suspension, a nozzle shape, a temperature and an air speed in a spray drier so that individually separated/individual droplets of the suspension of a size of 700 to 1200 μm are introduced into the spray tower; and
   drying the individually separated/individual droplets of the suspension, thereby obtaining a particulate porous spherical titanium dioxide having
   a $TiO_2$ content of at least 99.0% by weight,
   a particle size $d_{50}$ in the range of 30 to 350 μm,
   a tight particle size distribution (B 90/10) in the region of a maximum of 120 μm,
   a pore diameter of 1 to 30 nm,
   a pore volume of at least 0.1 cm$^3$/g, and
   a surface area of 30 to 300 m$^2$/g (BET).

* * * * *